United States Patent [19]

Shih

[11] 4,010,222

[45] Mar. 1, 1977

[54] BLENDS OF COPOLYESTERS AND ETHYLENE/CARBOXYLIC ACID COPOLYMERS WHICH ARE AT LEAST TEN PERCENT NEUTRALIZED

[75] Inventor: Chi-Kai Shih, Wilmington, Del.

[73] Assignee: E. I. Du Pont de Nemours and Company, Wilmington, Del.

[22] Filed: May 23, 1975

[21] Appl. No.: 580,512

[52] U.S. Cl. .................................. 260/873; 264/95
[51] Int. Cl.$^2$ ........................................ C08L 67/06
[58] Field of Search ..................................... 260/873

[56] References Cited

UNITED STATES PATENTS

| | | |
|---|---|---|
| 3,435,093 | 3/1969 | Cope ................................. 260/873 |
| 3,651,014 | 3/1972 | Witsiepe ............................ 260/873 |
| 3,763,109 | 10/1973 | Witsiepe ............................ 260/873 |
| 3,766,146 | 10/1973 | Witsiepe ............................ 260/873 |
| 3,833,708 | 9/1974 | Miller et al. ........................ 260/873 |
| 3,963,801 | 6/1976 | Su ..................................... 260/873 |

Primary Examiner—J. Ziegler

[57] ABSTRACT

Copolyesters blended with ethylene/carboxylic acid copolymer in which at least 10% of the acid groups are neutralized have increased melt strength, and are more readily processable by blow molding and extrusion film blowing techniques. The blends contain from 0.2 to 20% by weight of the ethylene/acid copolymer.

10 Claims, No Drawings

BLENDS OF COPOLYESTERS AND ETHYLENE/CARBOXYLIC ACID COPOLYMERS WHICH ARE AT LEAST TEN PERCENT NEUTRALIZED

This invention relates to blends of copolyester elastomers and ethylene/carboxylic acid copolymers in which at least 10% of the acid groups are neutralized that have a melt strength sufficiently great that the blend can be more readily processed by blow molding and film blowing than the copolyester without the ethylene/carboxylic acid copolymer.

The copolyester elastomers used in the blends of this invention are well known and are described, among other places, in U.S. Pat. Nos. 3,763,109, 3,766,146 and 3,651,014 to W. K. Witsiepe. These patents point out that the copolyesters can be used to form articles by blow molding and extruded to form film (blown and unblown).

In particular, the copolyesters used in this invention consist essentially of recurring intralinear long chain ester units and short chain ester units randomly joined heat-to-tail through ester linkages, the long chain ester units being represented by the formula

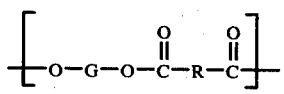

and the short chain ester units being represented by the formula

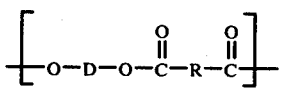

where G is a divalent radical remaining after the removal of terminal hydroxyl groups from at least one long chain glycol having a molecular weight of about 400–6000; R is a divalent radical remaining after removal of carboxyl groups from at least one dicarboxylic acid having a molecular weight less than about 300; and D is a divalent radical remaining after removal of hydroxyl group from at least one low molecular weight diol having a molecular weight of less than 250. The short chain ester units are present in the copolyester to the extent of between about 15 to 95% by weight of the copolyester, and often between about 25 and 85% by weight.

The copolymers are produced by the techniques described in the Witsiepe patents. It is preferred that the copolyesters are of such molecular weight that the inherent viscosity (0.1 gm./dl. in meta cresol at 30° C.) is between 0.75–1.7.

It has now been found that the addition of between about 0.2% and 20% by weight of a copolymer containing polymerized ethylene units and polymerized carboxylic acid units that are at least 10% neutralized to the copolyesters of the Witsiepe patents make compositions that are easier to process by blow molding techniques and by extrusion film blowing techniques.

The copolymer containing polymerized ethylene units and polymerized carboxylic acid units should contain between about 25 and 98.5% by weight ethylene units, and about 1.5 to about 30% by weight carboxylic acid containing units, and usually about 2 to 15% by weight carboxylic acid containing units. Other polymerized units can be present in major or minor amounts. Copolymers of this type are known in the art and described, among other places, in U.S. Pat. No. 2,599,123 to Pinkney, U.S. Pat. No. 3,264,272 to Rees, and Belgian Patent No. 818,609 to Greene. It is generally preferred that the carboxylic acid containing units be randomly distributed along the copolymer molecules. The Rees patent and the Greene patent teach how to obtain random copolymers. It is also possible to employ as the ethylene/carboxylic acid copolymer, polymers obtained by copolymerizing ethylene and other alkylenes, such as propylene and/or a diene such as hexadiene, and then grafting a carboxylic acid monomer to the polymeric substrate. Such grafting processes are described in published German Patent Applications 2,401,149 and 2,448,598. When polymers of this latter type are to be employed it is generally desirable that the other alkylenes of the copolymer be present in an amount such that the copolymer prior to grafting is elastomeric. Elastomeric copolymers of this type are well known and are taught, for example, in U.S. Patent 2,933,480 to Gresham and Hunt. Particularly desirable ethylene/carboxylic acid copolymers are the copolymers of ethylene and acrylic acid, methacrylic acid, maleic acid, fumaric acid, ethyl hydrogen maleate, or methyl hydrogen maleate. The above polymers can be made more elastomeric by the inclusion of such polymeric units as methyl acrylate, ethyl acrylate and the like in amounts up to about 60% by weight of the total polymer composition. Such copolymers containing between about 50 and 60 weight percent methyl acrylate form desirable blends with the copolyester. The other polymerized units listed in the Rees patent can also be included as desired. The ethylene containing copolymers useful in this invention are of high molecular weight and have a melt index (unneutralized) in the range of about 0 to 400 gm. per 10 minutes when measured under ASTM Test D 1238-52T at 190° C.

At least 10% of the acid groups on the ethylene copolymer must be neutralized with metallic ions. The preferred ions for neutralizing the acid groups are alkali metal ions, alkaline earth ions, and zinc ions, but the other ions shown in the Rees patent may also be employed. The amount of metallic ion in the polymer may be chemically equivalent to the number of acid groups, or substantially less, for even 10% neutralization of many copolymers gives the desired increase in melt tension. Polycarbodiimide can be used to increase the melt strength of such blends in which the acid groups are neutralized to an extent of greater than 10%. The polycarbodiimide also serves as a hydrolytic stabilizer for the blend.

The addition of substantially linear polycarbodiimide to copolyesters is known and taught, among other places, in U.S. Pat. No. 3,835,098 to Brown et al. The substantially linear polycarbodiimides contemplated for use in this invention are disclosed in the Brown et al. patent, i.e., polycarbodiimides having the formula $X_1-R^1\{N=C=N-R_2\}_n N=C=N-R_3-X_2$, where $R_1$, $R_2$ and $R_3$ are $C_1-C_{12}$ aliphatic, $C_6-C_{15}$ cycloaliphatic, or $C_6-C_{15}$ aromatic divalent hydrocarbon radicals and combinations thereof, $X_1$ and $X_2$ are

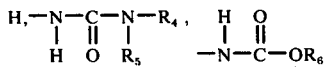

where $R_4$, $R_5$ and $R_6$ are $C_1$–$C_{12}$ aliphatic, $C_5$–$C_{15}$ cycloaliphatic and $C_6$–$C_{15}$ aromatic monovalent hydrocarbon radicals and combinations thereof and additionally $R_4$ and $R_5$ can be hydrogen, and $n$ is at least 2 and not more than 30 and preferably between 3 and 10.

The amount of polycarbodiimide that may be added to the blend can vary with the particular ethylene/acid copolymer employed, and the amount of neutralization of the acid groups, and with the particular polycarbodiimide added, but in general the polycarbodiimide can be present in an amount of about 0.2 to 30 percent by weight of the copolyester, preferably about 2 to 4% by weight.

The production of hollow objects from thermoplastics by blow molding is a known commercial method of manufacturing. See for example U.S. Pat. No. 3,745,150 to Corsover. The production of film from thermoplastics by extrusion and blowing is also a known commercial method of manufacturing. Both of these techniques have been previously disclosed as useful techniques for the processing of copolyesters; however, on a commercial scale such techniques have not been widely employed on these copolyesters because, it is believed, the copolyesters in the molten state have very little melt strength and when it is attempted to process the copolyesters by blow molding the extrudate (also called a parison), instead of hanging from the nozzle, often drops off. When attempts are made to blow such copolyesters into film, the resin tends to fold back onto the surface of the extrusion die.

The blends of the present invention provide compositions having the desirable properties of the copolyesters when formed into molded objects or film and improved processing characteristics, that is, the blends have increased melt strength. One method of measuring melt strength is to find the force necessary to draw the extrudate of a predried polymer at a constant rate of 10 ft./min. from an Instron capillary rheometer operated at a temperature 30° C. above the melting point of the copolyester and using a die having an outside diameter of 0.04 inch, length-to-diameter ratio of 4° and 90° entrance angle with Instron cross head speed of 0.2 in./min. (The polymer is predried for 1 hour at 100° C. in a vacuum oven before testing.) This force is referred to herein as melt tension. In order for a copolymer compound to be blow moldable and extrudable into blown film at commercially desirable rates the copolyester compound should have a melt strength such that the product will have a melt tension of at least 0.4 gm.

In the following examples all parts and percentages are by weight and all melt tension measurements are at 230° C. unless otherwise specified.

General Procedure for the Preparation of Blown Film

The copolyester thermoplastic elastomer, the ethylene/acid copolymer and other additives such as stabliizer and carbon black are thoroughly mixed in conventional equipment such as:

1. electrically heated rubber mill at 205°–210° C. for 7 min.
2. single screw extruder with a mixing die or mixing torpedo at 210° C. for 30–40 sec.
3. twin screw continuous mixer-extruder at 230°–275° C. for 5–10 sec. in the mixer before extrusion.

The blends are granulated or pelletized and dried at 70°–100° C. for 1–3 hours.

Film is blown on a film blowing machine by the following procedure. The dried blend pellets are fed into an extruder where they are melted and forced, under pressure, through an adaptor and into a tubing die. The melt flows around the mandrel of the die into a channel leading to the die lips. The melt leaving the die is in the form of a circular sleeve which is blown up by internal nitrogen or air to the desired final tube size and correspondingly thinner gauge. The tube travels vertically at full diameter until it reaches a pair of pinch rollers. The flattened tube is led away from the pinch rollers and wound on a roll. Sheets of film can be obtained by slitting the tube lengthwise.

Two important characteristics of the extruded film, the thickness and the width, are controlled by the through-put of the extruder, the blow up ratio (ratio of diameter of the tube to that of the die) and the up take rate of the pinch rollers.

The equipment used for the following examples is a Killion 1 inch extruder and a conventional blow film device as just described. The molten copolyester flows through a three-fourths inch diameter ring die with a gap of ~50 mil. Usually the temperature inside the extruder is set at 5–10° C. above the melting point of the particular copolyester themoplastic elastomer being used. The temperature of the die is set at about the same temperature as the melting point of the thermoplastic elastomer.

Control 1

Polyether polyester thermoplastic elastomer A (see Table I) pellets were fed into the film blowing apparatus. The temperature settings for the extruder unit were: 150° C. rear 210°–220° C. center and front, 205°–210° C. die. When the molten polymer blend exited from the die, it flowed sideways and folded backward.

Although the molten extrudate was very fluid it could be led manually to the up-take rollers. Attempts to blow up the extruded tube into an inflated cylinder were difficult and generally failed due to the folding back of the extrudate which caused leakage of the bubble. With extreme care films of less than 5 mil. thick could be obtained at a blow up ratio of less than 1. Attempts to increase the blow up ratio resulted in the formation of 1 to 2 mil films. The melt tension of the themoplastic elastomer A was <0.1 gm.

Table I and Table II list the various copolyester and ethylene/acid copolymers used in the examples.

TABLE I

The copolyester thermoplastic elastomers may be prepared by the procedures described in U.S. Pats. Nos. 3,651,014, 3,766,146, and 3,763,109 all to W. K. Witsiepe. The polymers have the following compositions and melt index as measured by tentative ASTM method D-1238-52T.

The thermoplastic elastomers also contain ~1 weight percent antioxidant and catalyst residues.

TABLE I

| Thermoplastic Elastomer | Phthaloyl (Wt.%) Tere | Iso | Ortho | Wt. % PTMEG[a] -1000 | Wt. % 1,4-Butanediol | Melt Index 200° C. | 220° C. |
|---|---|---|---|---|---|---|---|
| A | 44.7 | — | 4.4 | 19.4 | 31.0 | — | 7.2 |
| B | 40.2 | — | — | 35.1 | 23.6 | — | 7.6 |
| C | 44.7 | — | 4.4 | 19.4 | 31.0 | — | 4.2 |
| D | 27.2 | 7.9 | — | 44.5 | 19.4 | 6.3 | — |

[a]Polytetramethylene ether glycol

TABLE II

Ethylene/Acid Copolymer Compositions

| Copolymer | Composition[a] | % Neutralization | Metal Ions | M.I.[c] |
|---|---|---|---|---|
| A | 16% methacrylic acid | 60 | Na+ | 0.9 |
| B | 16% methacrylic acid | ~100[b] | Na+ | <0.1 |
| C | 11% methacrylic acid | 54 | Zn++ | 5.0 |
| D | 11% methacrylic acid | 75–100 | Zn++ | ~0.7 |
| E | 16% isobutyl acrylate, 60% methacrylic acid | ~100[b] | Na+ | — |
| F | ~54% methyl acrylate, 4% ethyl hydrogen maleate | 100 | Na+ | <0.1 |
| G | 34% methyl acrylate 2.8% methacrylic acid | 100 | Ca++ | <0.1 |
| H | 25.4% propylene, 4.5% hexadiene, 1.5% grafted fumaric acid | 35 | Zn++ | — |
| I | 10% methacrylic acid | ~100 | Zn++ | ~1.0 |
| J | 11% methacrylic acid | ~75 | Na+ | ~0.7 |
| K | 15% methacrylic acid | ~40 | Na+ | 1.2 |
| L | ~54% methyl acrylate, 4% ethyl hydrogen maleate | ~100[b] | Zn++ | <0.1 |

[a]All polymers contain complemental amounts of ethylene.
[b]100% Neutralization indicates equivalent amount of metal ions are present to convert all the carboxylic acids to their salts. The reaction may not be 100% complete.
[c]Melt Index was measured according to ASTM D 1238-52T at 190° C. on the neutralized product.

EXAMPLE 1

One hundred parts of thermoplastic elastomer A were blended with 13 parts of copolymer A (see Table II) on a 3 inches electrically heated roll mill at 205°–210° C. for 10–15 minutes. The blend was out on a cold mill to a sheet about one-eighth inch thick. The sheet was granulated into one eighth inch chips. The chips, after drying by sweeping with a stream of nitrogen for about 12 hours and further drying at 100° C. in a vacuum oven for 1 hour, were fed into the extruder of the film blowing apparatus. The blend could be blown into films 10 mils or more thick using a blow up ratio of more than 3. The melt tension of the blend was >5.0 gms.

EXAMPLE 2

The procedure of Example 1 was repeated using 4 parts of copolymer A. The blend was blown into film at least 10 mils thick, using a blow up ration of more than 2. The melt tension of the blend was 0.9 gm.

EXAMPLE 3

The procedure of Example 1 was repeated except that 10 parts of copolymer A were used and the blending was carried out by a Farrel 2 CM (Farrel Co., Ansonia, Conn.) twin screw continuous mixer extruder at ~475° F.

This blend was blown into film as in Example 1. The melt tension of the blend was 2.4 gms.

EXAMPLE 4

The procedure of Example 3 was followed using the following thermoplastic elastomer-ethylene/acid copolymer blend: thermoplastic elastomer A (100 parts); copolymer A (2 parts); copolyester C containing 20% of a mixture of hindered aromatic polycarbodiimides having an average molecular weight of about 1000 the polycarbodiimide contains units of the following structure:

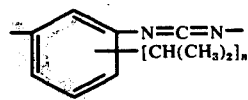

wherein n has an average value of about 3 and is sold as "Stabaxol" PCD by Naftone, Inc., New York, N. Y.) (15 parts); Copolyester D containing 40% SAF carbon black (10 parts).

The blend could be blown into films more than 10 mils thick using a blow up ratio of greater than 2. The melt tension of the thermoplastic elastomer-ionomer blend was 0.8 gm.

EXAMPLE 5–15

These examples were conducted as those described above using thermoplastic elastomer A and the other ingredients shown in Table III.

TABLE III

| Example | Ethylene Acid Copolymer | Parts | Stabilizer Mixture Parts | Melt Tension gm. |
|---|---|---|---|---|
| 5 | B | 2 | — | 0.5 |
| 6 | J | 10 | — | 1.7 |
| 7 | K | 1 | 10[a] | 1.2 |
| 8[c] | C | 8.3 | 20[b] | 0.5 |
| 9[c] | D | 8.3 | 20[b] | 0.6 |
| 10 | E | 5 | — | 0.6 |

TABLE III-continued

| Example | Ethylene Acid Copolymer | Parts | Stabilizer Mixture Parts | Melt Tension gm. |
|---|---|---|---|---|
| 11 | F | 5 | — | 0.4 |
| 12 | G | 10 | — | 0.95 |
| 13 | H | 9.5 | — | 0.95 |
|  | I | 0.5 |  |  |
| 14[c] | D | 5 | 20[b] | 0.5 |
| 15[c] | J | 5.8 | 15[a] | ~0.9 |

[a] A mixture containing 20% of the polycarbodiimide of example 4 and 80% thermoplastic elastomer C.
[b] A mixture containing 20% of the polycarbodiimide of example 4 and 80% thermoplastic elastomer B.
[c] These samples also contained 10 parts of a mixture containing 40% SAF carbon black and 60% thermoplastic elastomer C.

EXAMPLE 16

One hundred parts of thermoplastic elastomer C and 10 parts of ethylene/acid copolymer A were mixed and blown into film using the procedure of Example 1, except that the temperature settings of the extruder unit were:

| Rear | 150° C. |
|---|---|
| Center | 185° C. |
| Front | 185° C. |
| Die | 180° C. |

The blend was blown into a film at least 10 mils thick using a blow up ratio of more than 2. The melt tension of the blend was 0.5 gm.

Control 2
General Procedure for Blow Molding

An Impco screw extrusion blow molding machine Model No. B-13S-R17 was used under the following conditions:

| Rear screw section temperature | = | 205° C. |
|---|---|---|
| Front screw section temperature | = | 215° C. |
| Die temperature | = | 215° C. |
| Nozzle temperature | = | 220° C. |
| Blow cycle | = | 6 sec. |
| Exhaust cycle | = | 8 sec. |
| Air pressure | = | 60 lbs. |
| Mold temperature (regulated by water) | = | 80° C. |

Polymer pellets were fed into the extruder, melted and extruded as a molten hollow slug (parison) of predetermined weight and wall thickness. The two halves of the mold were then closed around the hollow slug. Compressed air is introduced into the interior of the slug forcing the slug to expand and conform to the shape of the mold. The molded article was kept in the mold for a short time to cool, thus attaining form stability, before the mold halves were separated and the article removed.

In order to successfully blow mold, the extruded slug must be able to maintain its shape without distortion before the mold halves are closed and the compressed air is introduced. A mold for the shaping of a 6½ inches × 2½ inches bottle was used.

A blow molding experiment as described above was carried out using thermoplastic polymer B. The molten extruded slug continued to elongate before the mold could be closed. The distortion of the slug was so rapid that when the mold was closed and before the blowing up process could be completed, only a portion of the slug remained within the confine of the mold. This rendered the blow up process impossible most of the time because the air leaked through the wall of the slug. When the slug was blown up, the molded articles were so badly distorted in dimension and thickness that they were useless. The melt tension of the thermoplastic elastomer was 0.2 gm.

EXAMPLE 17

The procedure of Control 2 was repeated using thermoplastic elastomer B containing 10 parts of ethylene/acid copolymer A. The blend was mixed in a single screw extruder with a mixing die and extruded in the form of pellets. The extruded slug from this sample was dimensionally stable long enough for the mold to close and the blowing up process to be completed. Uniform molded articles were obtained. The melt tension of the blend was 2.5 gms.

EXAMPLE 18

The blend of Example 3 was used in the procedure of Example 16. The extruded slug had very good dimensional stability and was readily blown into the desired article with no distortion.

EXAMPLE 19

The following blend was prepared and may be used for film blowing and blow molding:

| Copolyester C | Ethylene/Acid Copolymer A | Melt Tension |
|---|---|---|
| 90 | 10 | 7.2 |

Copolyester C, unblended, had a melt tension of about 0.2 gm.

EXAMPLE 20

The following blend was prepared and may be used for film blowing and blow molding:

| Copolyester C | Ethylene/Acid Copolymer L | Melt Tension |
|---|---|---|
| 80 | 20 | 10.0 |

Copolyester C, unblended, had a melt tension of about 0.2 gm.

EXAMPLE 21

The following blends were prepared and may be used for film blowing and blow molding:

| Copolyester B | Ethylene/Acid Copolymer K | Melt Tension |
|---|---|---|
| 90 | 10 | 0.9 gm. |
| 80 | 20 | 1.8 gms. |

Copolyester B, unblended, has melt tension of about 0.2 gm.

EXAMPLE 22

The following blend was prepared and may be used for film blowing.

| Copolyester D | Ethylene/Acid Copolymer A | Melt Tension 185° C. |
| --- | --- | --- |
| 90 | 10 | 2.9 gms. |

Copolyester D, unblended, had a melt tension of 0.35 gm. at 185° C.

I claim:

1. A blend consisting essentially of 80 to 99.8% by weight of a copolyester consisting essentially of recurring intralinear long chain ester units and short chain ester units randomly joined head-to-tail through ester linkages, the long chain ester units being represented by the formula

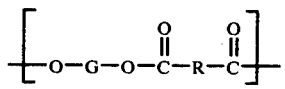

and the short chain ester units being represented by the formula

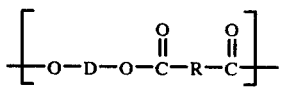

where G is a divalent radical remaining after the removal of terminal hydroxyl groups from at least one long chain glycol having a molecular weight of about 400–6000; R is a divalent radical remaining after removal of carboxyl groups from at least one dicarboxylic acid having a molecular weight less than about 300; and D is a divalent radical remaining after removal of hydroxyl group from at least one low molecular weight diol having a molecular weight of less than 250, said short chain ester units being present in the polyester to the extent of between about 15 and 95% by weight of the polyester, and 0.2 to 20% by weight of a copolymer containing ethylene units and carboxylic acid containing units, said copolymer containing between about 25 and 98.5% by weight ethylene units, and about 1.5 and 30% by weight carboxylic acid containing units, said carboxylic acid units being from 10 to 100% neutralized with metallic ions, said blend having a melt tension of at least 0.4 gm.

2. The blend of claim 1 in which the ethylene copolymer also contains polymerized methyl acrylate units.

3. The blend of claim 2 in which the methyl acrylate units are present to the extent of about 50–60 weight percent of the ethylene copolymer.

4. The blend of claim 1 in which the ethylene copolymer contains 2 to 15% by weight carboxylic acid containing units.

5. The blend of claim 4 in which the carboxylic acid containing units are ethyl hydrogen maleate.

6. The blend of claim 1 in which the short chain ester units of the copolyester component amount to about 23 to 85% by weight of the copolyester.

7. The blend of claim 1 in which the copolyester has an inherent viscosity at a concentration of 0.1 g./dl. in meta cresol at 30° C. of between about 0.75 and 1.7.

8. The blend of claim 7 in which the ethylene containing copolymer contains polymerized methyl acrylate units and the carboxylic acid containing polymerized units are ethyl hydrogen maleate.

9. The blend of claim 7 in which a portion of the acid groups on the ethylene copolymer are neutralized with alkali metal ions, alkaline earth metal ions, or zinc ions.

10. The blend of claim 7 in which the ethylene containing copolymer contains polymerized methacrylic acid.

* * * * *